United States Patent [19]

Clark et al.

[11] Patent Number: 4,761,785

[45] Date of Patent: Aug. 2, 1988

[54] PARITY SPREADING TO ENHANCE STORAGE ACCESS

[75] Inventors: Brian E. Clark, Rochester, Minn.; Francis D. Lawlor, Saugerties; Werner E. Schmidt-Stumpf, Patterson, both of N.Y.; Terrence J. Stewart, Rochester; George D. Timms, Jr., Rochester, both of Minn.

[73] Assignee: International Business Machines Corporation, Armonk, N.Y.

[21] Appl. No.: 873,249

[22] Filed: Jun. 12, 1986

[51] Int. Cl.⁴ .............................................. G06F 11/10
[52] U.S. Cl. ........................................ 371/51; 371/38
[58] Field of Search ..................... 371/35, 49, 50, 51, 371/38; 364/200, 900; 365/200

[56] References Cited

U.S. PATENT DOCUMENTS

| | | | |
|---|---|---|---|
| 3,387,261 | 6/1968 | Betz | 371/50 |
| 4,092,732 | 5/1978 | Ouchi | 364/900 |
| 4,335,458 | 6/1982 | Krol | 371/38 |
| 4,433,388 | 2/1984 | Oosterbaan | 371/49 X |
| 4,653,055 | 3/1987 | Micic | 371/51 X |
| 4,842,262 | 11/1984 | Sullivan | 364/200 |

OTHER PUBLICATIONS

IBM Technical Disclosure Bulletin, vol. 24, No. 2, Jul. 1981 "Efficient Mass Storage Parity Recovery Mechanism" F. D. Lawlor, pp. 986–987.

Primary Examiner—Joseph Ruggiero
Assistant Examiner—Robert W. Beausoliel
Attorney, Agent, or Firm—Bradley A. Forrest

[57] ABSTRACT

A storage management mechanism distributes parity blocks corresponding to multiple data blocks substantially equally among a set of storage devices. N storage units in a set are divided into a multiple of equally sized address blocks, each containing a plurality of records. Blocks from each storage unit having the same address ranges form a stripe of blocks. Each stripe has a block on one storage device containing parity for the remaining blocks of the stripe. Further stripes also have parity blocks, which are distributed on different storage units. Parity updating activity associated with every change to a data record is therefore distributed over the different storage units, enhancing access characteristics of the set of storage devices. The parity updating activity also includes the use of an independent version number stored with each data record and corresponding version numbers stored with the parity record. Each time a data record is changed, its version number is incremented and the corresponding version number in the parity record is incremented with the parity record update.

22 Claims, 5 Drawing Sheets

PARITY SPREADING TO ENHANCE STORAGE ACCESS

BACKGROUND OF THE INVENTION

The present invention relates to maintaining parity information on multiple blocks of data and in particular to the storage of such parity information.

U.S. Pat. No. 4,092,732 to Ouchi describes a check sum generator for generating a check sum segment from segments of a system record as the system record segments are being transferred between a storage subsystem and a central processing unit. The check sum segment is actually a series of parity bits generated from bits in the same location of the system record segments. In other words, each bit, such as the first bit of the check sum segment is the parity of the group of first bits of the record segments. When a storage unit containing a record segment fails, the record segment is regenerated from the check sum segment and the remaining system segments. One storage unit is selected for containing all the check sum segments for a plurality of record storage units.

In the Ouchi patent, the check sum segment is always generated from reading all the record segments it covers. If one record segment is changed, all the record segments covered are read and the checksum segment is generated. An IBM Technical Disclosure Bulletin, Vol. 24, No. 2, July 1981, pages 986–987, Efficient Mass Storage Parity Recovery Mechanism, improves upon the generation of the checksum segment, or parity segment by copying a record segment before it is changed. The copy of the record segment is then exclusive-ORed with the changed record segment to create a change mask. The parity segment is then read and exclusive-ORed with the change mask to generate the new parity segment which is then written back out to the storage unit.

While a number of reads on record segments that are not changed is avoided in the prior art, a single storage unit is used to store parity segments for multiple record segments on multiple storage devices. A read and a write on the single storage unit occurs each time a record is changed on any of the storage units covered by the parity record on the single storage unit. Thus, the single storage unit becomes a bottle-neck to storage operations since the number of changes to records which can be made per unit of time is a function of the access rate of the single storage unit as opposed to the faster access rate provided by parallel operation of the multiple storage units.

Recovery of a lost record depends on the synchronization of the parity record with each of the data records that it covers. Without special hardware, such as nonvolatile storage, and/or additional write operations to storage units, it is difficult to guarantee that both the data records and parity record are updated to a consistent state if the system terminates abnormally. Since two I/O operations are required to update the data and its associated parity, it is difficult to determine which I/O operation has completed following the system termination.

SUMMARY OF THE INVENTION

A storage management mechanism distributes parity information substantially equally among a set of storage units. N storage units in a set are divided into a plurality of equally sized address areas referred to as blocks. Each storage unit contains the same number of blocks. Blocks from each storage unit in a set having the same unit address ranges are referred to as stripes. Each stripe has N-1 blocks of data and a parity block on one storage device containing parity for the remainder of the stripe. Further stripes each have a parity block, the parity blocks being distributed on different storage units. Parity updating activity associated with every modification of data in a set is therefore distributed over the different storage units. No single unit is burdened with all the parity update activity.

In the preferred embodiment, each storage unit participating in a set is the same size. This permits a simplified definition of the stripes. Since each storage unit is the same size, no storage unit has areas left over which need to be handled separately.

The number of storage units in a set is preferably more than two. With just two units, the protection is similar to mirroring, which involves maintaining two exact copies of data. With more than two units, the percent of storage dedicated to protection decreases. With three units, the percentage of storage needed to obtain the desired protection is about 33 percent. With eight units, slightly more than 12.5 percent of storage capacity is used for protection.

In a further preferred embodiment, N-1 data records (520 bytes) and 1 parity record in a set having the same address range is referred to as a slice. Each data record in the slice has a version indicator which indicates the version of the record. A header in each parity record comprises a plurality of version indicators, one corresponding to each of the data records in the slice. Each time a data record is updated, its version indicator is incremented and the parity record version indicator corresponding to that data record is also incremented. When both the record update and the parity update are complete, the version indicators are equal. During recovery of a lost record, the version numbers are checked to ensure synchronization of the records with the parity. Forcing recovery without valid synchronization would produce unpredictable data.

Because each data record has a version number that is independent of every other data record, no serialization is required for updates to different data records covered by the same parity record. Also avoided, is the need to read the parity record from storage before scheduling the data record write operation and queueing a parity update request.

In a further preferred embodiment, an unprotected stripe is provided for data records which need not be covered by parity groups. The unprotected stripes need not be the same size as the protected stripes, and may include variable size areas on the storage units if the storage units are not identical in size. Such striping provides a convenient method of segregating the storage units into areas of protected and unprotected storage because the same address area of each storage device is subject to protection. Performance benefits are realized if it is unnecessary to protect all the records stored on the units because there is no parity update required after a record in an unprotected stripe is changed.

DETAILED DESCRIPTION OF THE PREFERRED EMBODIMENT

Figure 1:
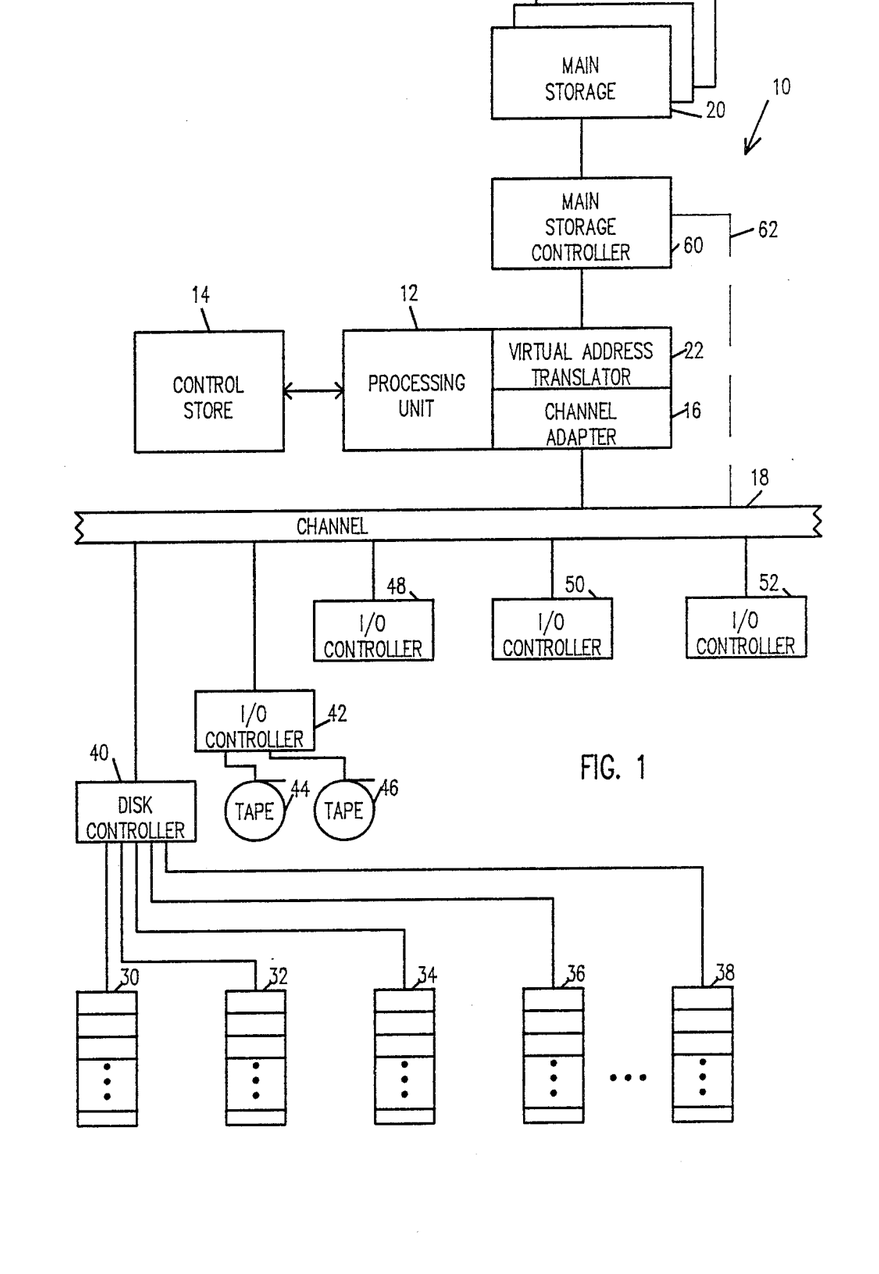
FIG. 1 is a block diagram of a system incorporating the parity block protection distribution of the present invention.

A computer system implementing block parity spreading is indicated generally at 10 in FIG. 1. System 10 comprises a data processing unit 12 coupled to a control store 14 which provides fast access to microinstructions. Processor 12 communicates via a channel adapter 16 and through a high-speed channel 18 to a plurality of I/O units. Processor 12 and the I/O units have access to a main storage array 20. Access to main storage 20 is provided by a virtual address translator 22. Address translation tables in main storage 20, and a translation lookaside buffer provide mapping from virtual to real main storage addresses.

Each I/O device, such as disk drives 30, 32, 34, 36, and 38 is coupled through a controller, such as a disk storage controller 40 for the above disk drive storage devices. I/O controller 42 controls tape devices 44 and 46. Further I/O controllers 48, 50 and 52 control I/O devices such as printers, workstations, keyboards, displays, and communications. There are usually multiple disk storage controllers, each controlling multiple disk drive storage devices.

Data in system 10 is handled in the form of records comprising 512 byte pages of data and 8-byte headers. In the preferred embodiment, an IBM System/38, records are moved into and out of main storage 20 from disk storage via the channel 18. A main storage controller 60 controls accessing and paging of main storage 20. A broken line 62 between channel 18 and main storage controller 60 indicates direct memory access to main storage 20 by the I/O devices coupled to the channel. Further detail on the general operation of system 10 is found in a book, IBM System/38 Technical Developments, International Business Machines Corporation, 1978.

Figure 2:
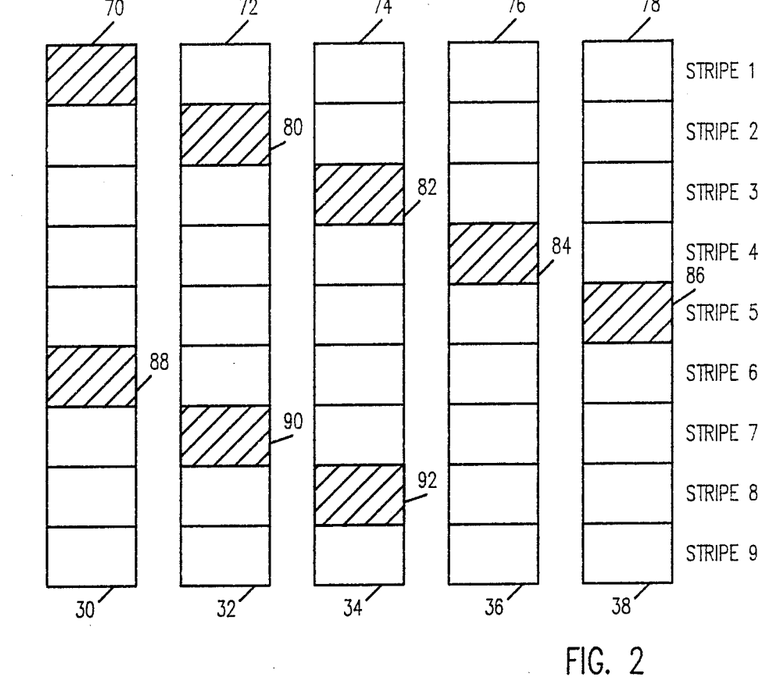
FIG. 2 is a block diagram of the distribution of the parity blocks of FIG. 1 over a plurality of storage devices.

Protection of data on the disk storage devices 30 through 38 is provided by exclusive ORing data records on each device, and storing the parity record resulting from the exclusive OR on one of the storage devices. In FIG. 2, each storage device 30 through 38 is divided into blocks of data and blocks of parity. The blocks represent physical space on the storage devices. Since the system 10 provides an extent (a contiguous piece of allocatable disk space) of up to 16 megabytes of data, each block is preferably 16 megabytes.

Blocks 70, 72, 74, 76 and 78, one on each storage device, preferably having the same physical address range, are referred to as a stripe. There are 9 stripes shown in FIG. 2. Each protected stripe has an associated parity block which contains the Exclusive OR of the other blocks in the stripe. In the first stripe, block 70 contains the parity for the remaining blocks 72, 74, 76 and 78. A block 80 on storage device 32 contains the parity for the remaining blocks on the second stripe. Block 82, on storage device 34 contains the parity for the third stripe. Blocks 84 and 86 contain the parity for the fourth and fifth stripes respectively. The parity blocks, including blocks 88, 90, and 92 for stripes 6, 7 and 8 are spread out, or distributed over the storage devices. The 9th stripe is an unprotected area which does not have a parity block associated with it. It is used to store data which does not need protection from loss.

Spreading of the parity information ensures that one particular storage device is not accessed much more than the other storage devices during writing of the parity records following updates to data records on the different stripes. A change to records stored in a block will result in a change also having to be made to the parity block for the stripe including the changed records. Since the parity blocks for the stripes are spread over more than one storage device, the parity updates will not be concentrated at one device. Thus, I/O activity is spread more evenly over all the storage devices.

Figure 3:
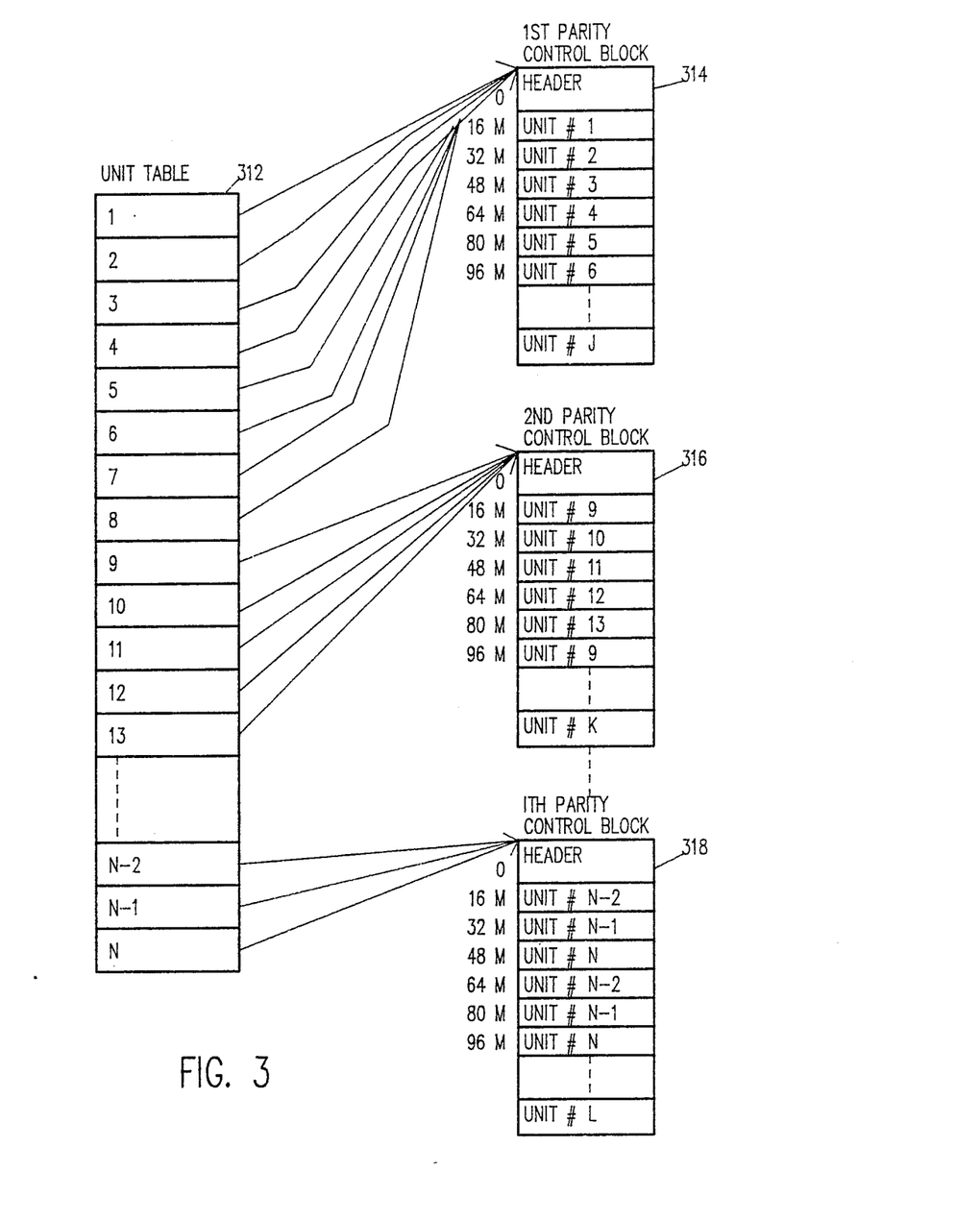
FIG. 3 is a block diagram representation of logical tables used to correlate parity groups and data records.

In FIG. 3, a unit table 310 contains information for each storage unit which participates in the parity protection. A physical address comprising a unit number and a sector, or page number is used to identify the location of the desired data. The unit table is then used to identify parity control blocks indicated at 314, 316, and 318. Units 1-8 are members of the first parity set associated with control block 314. Units 9-13 are members of the second parity set associated with control block 316, and units N-2 to N are members of the Ith parity set associated with control block 318.

Each entry in the unit table points to the control block associated with the set of storage devices of which the entry is a member. The control blocks identify which unit of the set contains the parity block for each stripe. In control block 314, the stripe comprising the first 16 megabytes of storage has its parity information stored in unit number 1 in unit number 1's first 16 megabytes. The second 16 megabytes of the stripe comprising units 1-8 is contained in the second 16 megabytes of unit number 2. The parity block allocation continues in a round robin manner with units 3-8 having parity for the next 6 stripes respectively. The ninth stripe in the first parity set has its parity stored in the ninth block of 16 megabytes on unit number 1. The last stripe, allocated to unit J, one of the eight units in the set, may not contain a full 16 megabytes depending on whether the addressable storage of the units is divisible by 16 megabytes.

A header in each of the parity control blocks describes which units are in the set, and also identifies an address range common for each of the units which is not protected by a parity group. Having a common range for each unit which is not protected, simplifies the parity protection scheme. Since the same physical addresses on each storage device are exclusive ORed to determine the parity information, no special tables are required to correlate the information to the parity other than those shown in FIG. 3. The common unprotected address range requires no special consideration, since the identification of the range is in the control block and is common for each unit.

Parity control block 316 corresponds to the set of storage units 9-13 in FIG. 3. These five units may be thought of as storage units 30-38 in FIG. 2. The allocation of parity groups to storage units is on a round robin basis. Each consecutive 16 megabytes of storage has its parity group stored on consecutive storage devices starting with device 30, or unit number 9 in FIG. 3. Unit number 9 also contains the parity group for the 80–96 megabyte range of the stripe for storage units 9–13 (30–38). The last stripe in the set has its parity stored on the Kth unit, where K is the unit where the allocation of parity blocks ends because there are no more protected stripes.

Control block 318 corresponds to the set of storage units N-2 through N in the Ith set of storage units. The last unit allocated a parity block is labeled L, and is one of the three units in the set depending on the number of stripes in the set. The Ith set contains the minimum number of storage units, three, considered desirable for implementation of the parity protection. The use of two units would be possible, but would be similar to mirroring, with the extra step of an exclusive OR. Eight units in a set has been selected as the maximum in the preferred embodiment due to a system specific constraint to be discussed below. More than eight units may be used in a set without loss of protection.

With a very large number of units in a set, reconstruction of the data lost when a single unit fails would take a longer time because each unit would have to be read. There is also an increased chance of loss of more than one unit at a time. If this occurs, it is not possible to reconstruct the data from either of the lost units using the simple parity discussed above. The invention is considered broad enough to cover a more complex data protection code, which may be stored similarly to the parity, and permit multiple bit correction in the event more than one storage device fails. A set could also be arranged multidimensionally as described in the IBM TDB, Vol 24, No. 2 Pages 986–987, to permit reconstruction of data from at least two failed units. Further embodiments spread the parity information based on frequency of updating data to spread the I/O activity evenly, as opposed to spreading the parity itself evenly.

Figure 4:
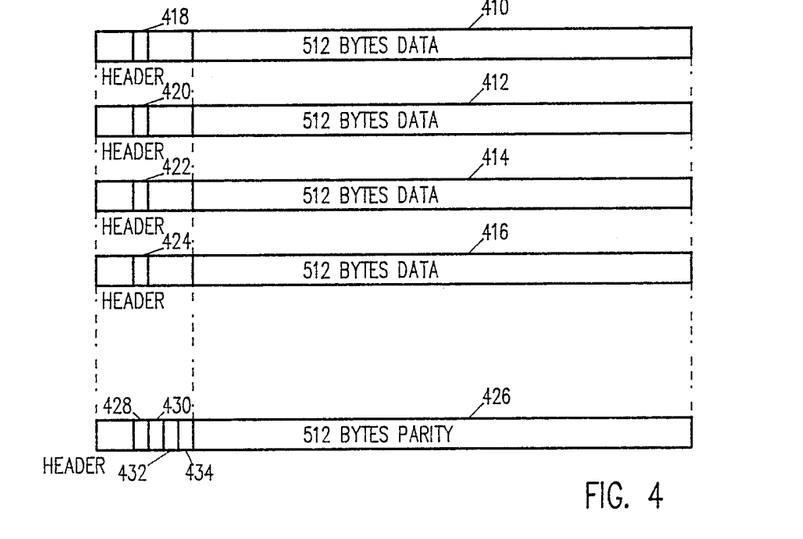
FIG. 4 is a block diagram of records in a stripe of storage utilizing version indications for synchronization.

Each data record contains a version number. Since updates to multiple data records, covered by one parity record may occur, each record in a parity block also contains a corresponding version indication for each record in the slice it covers. A slice is a set of data records and their corresponding parity record. The version indications are not covered by the parity protection scheme. In FIG. 4, four data records, 410, 412, 414 and 416 each contain a header with a record version number indicated at 418, 420, 422 and 424 respectively. A parity record 426 contains a header with four version numbers, 428, 430, 432 and 434 corresponding to the version numbers in the data records. The version numbers or indications may be any length compatible with the number of bits available in the record headers. A one bit length was chosen due to the unavailability of further bits. Each time a data record is changed, its version number is incremented. The corresponding version number in the parity record is also incremented so that they have the same value.

The version numbers are used to check for synchronization of the parity record with each data record in a slice in the event of lost data. When changes to several data records occur, the data records may be written to disk storage before or after the parity records are updated with the change masks. The change masks are queued for incorporation into the parity records. Associating a version number with each parity and data record adds a constraint that parity record updates for a given data record to disk storage must be processed in the same order as the data record updates. Otherwise, the version numbers may not be accurate. A FIFO queue holds the change masks so that they are incorporated into the parity records on mass storage in the order that the change masks were generated.

Special consideration is given to the version numbers due to the limited availability of bits in the headers. The version number for each data record is stored in the first bit position of the 6th byte of the respective records. The corresponding version numbers in the parity record are contained in the first 4 bit positions of the 6th byte and the first 3 bit positions of the 8th byte of the header. The bit positions for the parity record header version numbers will be referred to as bits 1–7 corresponding to the order described above. The units in a set are numbered 1-n corresponding to their order in the parity control block for the set. The version numbers are stored in ascending order, based on the unit number, in the parity record headers, skipping the parity unit. If the third unit is the parity unit, the version numbers corresponding to the first two units are stored in bit positions 1 and 2. The version number corresponding to the fourth unit is stored in bit position 3. The nth unit version number is in position n-1 in the parity record header. Storing version numbers in this manner permits the largest possible set given the storage limitation. With extra storage, the size of the set may be optimized as a function of other system considerations. The positioning of the version numbers in the parity header could also have a straight forward unit number to bit position correspondence.

Because each data record has a version number that is independent of every other data record, no serialization is required for updates to different data records covered by the same parity record. Transfer of records into and out of main storage may be based on other system through-put considerations to improve processing speed. The separate version numbers also eliminate the need to read to parity records from mass storage before scheduling a data record write operation and queueing a parity update request.

In order to limit the amount of storage occupied by a version number, it is allowed to wrap from the largest to the smallest value without error. This enables the version number to be reused. If a one bit version number is used, it wraps from 1 to 0. Thus, there are two values it assumes. A version number with a higher number of bits allows more values. Since data record and parity record updates are asynchronous, an update to a data record is held if the updated version number could be confused with an existing version number. Such confusion could exist if the same version number as the version number associated with the update, could exist on the data record or the parity record on mass storage. The time frame that must be considered is from the time a new parity update request is placed on the FIFO queue to the time the request is completed. Both the data record and the parity record must be updated before an update request is considered complete.

The version numbers that could exist on disk before a new update request is completed include all the values for prior update requests that are still on the queue plus the value that precedes the first (oldest) request element in the queue. If an update request is not removed from the queue until it is completed, it is only necessary for a new update to wait if there are other requests on the queue for the same data record, and the incremented version number for the new data record matches the version number preceding the first request element still in the queue.

The performance cost of searching the queue before scheduling an update is not severe as long as the number of update requests in the queue remains small. A reasonably fast access time to the storage used for the queue also reduces the performance cost. Mainstore provides a suitable storage area for the queue. Keeping the number of update requests in the queue small is also important to ensure that no request has an excessive wait time.

When, as in the preferred embodiment, the version numbers are implemented as single bit flags, it is only necessary to search the queue for any prior update request to the same data record in order to determine whether a new update must wait. There is no need to check version number values, because a new request must always wait if there is an incomplete request in the queue for the same data block.

In the preferred embodiment, the record headers contain seven unused bits available for implementation of the present invention. This places a limit on the number of units which may participate in a set. Only seven version numbers may be kept in a parity record, so only up to eight total units participate in a parity protection set. As mentioned before, many more units, or as little as three units could efficiently make use of the present invention.

CONFIGURATION OF SYSTEM FOR PARITY PROTECTION

Figure 5:
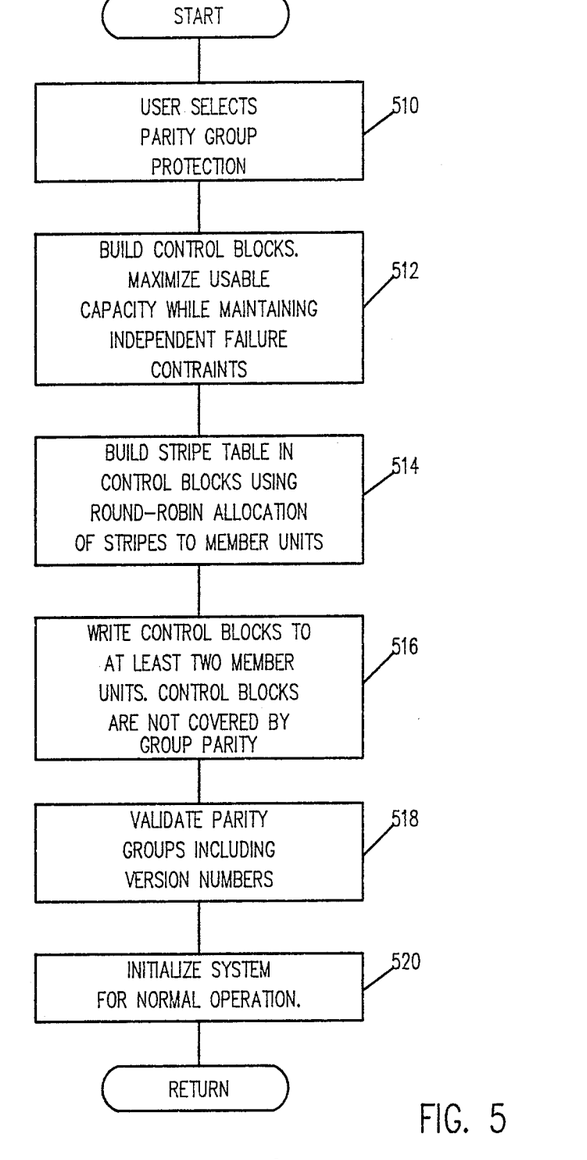
FIG. 5 is a flow diagram of the initialization of storage devices for parity block protection.

Configuration of the system for parity protection of data is initiated by a user at 510 in the flow diagram of FIG. 5. A set-up task on processor 12 builds the parity control blocks 314–318 in block 512 of the flow diagram. The task uses information in a configuration unit table 312 which identifies the storage units coupled to the system. A storage device, such as the IBM 3370 may have more than one independent unit in it, such as an independently accessible arm, but only one unit from a storage device is chosen for any particular set. Another criterion for unit selection involves using as many disk controllers as possible in a set. These criteria are used so that a failure mode will not affect two units in a set. The set-up task also maximizes useable capacity by maximizing the number of units in a set.

After the control blocks have been built, the stripe arrays in the control blocks are built at 514. The stripe arrays, as previously mentioned assign parity blocks on a round robin basis to member units in each set. The stripe arrays are formed to indicate which units contain the parity blocks for successive stripes comprising 16 megabyte blocks from each unit. A user may also define a size of unprotected storage desired. A definition of the address range of the unprotected stripe is entered in the header of the control block. The setup task will not define a block from the unprotected stripe as a parity block, so the entire unprotected stripe will be available for data records.

Next, the set up task writes the control blocks at 516 to more than one member unit of each set to which the control blocks correspond. The control blocks are used during recovery to identify the members of the sets. Thus, they must be available without parity recovery. They are written to more than one member unit of each set in case one of the member units containing it fails. In the event that the protection scheme protects against failure of more than one unit, the control blocks are written to at least one more unit than the number of units which may be recovered. In the preferred embodiment, they are written to each member of the set so that the units need not be searched to determine which unit contains the control block. Now that the sets are identified, and the control blocks built, block 518 of the set-up task validates the parity blocks including the version numbers. In the preferred embodiment, this is done by zeroing all the data on all the units. Since even parity is used for the parity protection, the result is a valid parity for all the data. The version numbers are also zero to start with.

The system is then initialized in a standard manner at 520 by causing an initial program load.

It is also possible to add a member to a set which does not yet have the maximum number of units. The new member is preferably zeroed, and added to the unit table. The parity blocks of the set are then redistributed to include the new unit. The control block for the set is then revised, and the units which contained parity blocks that were transferred to the new unit have their address ranges which contained the parity blocks zeroed, validating the parity group for that stripe.

In the preferred embodiment, the control block is temporarily revised to indicate a change in the set will occur due to the addition of the new unit. The temporary change is done in case a failure occurs during redistribution of the parity blocks. The parity blocks of an existing set are then redistributed to include the new unit. The units which contained parity blocks that were transferred to the new unit have their address ranges which contained the parity blocks zeroed. When redistribution is complete, the changes to the control block are made permanent.

It is also possible to add a new unit without transferring parity blocks. Not transferring the parity blocks would fail to make use of the increase in access rate of the set possible by adding the new unit. The new unit would however be protected by the existing parity blocks.

UPDATING RECORD AND PARITY IN A SLICE

Figure 6:
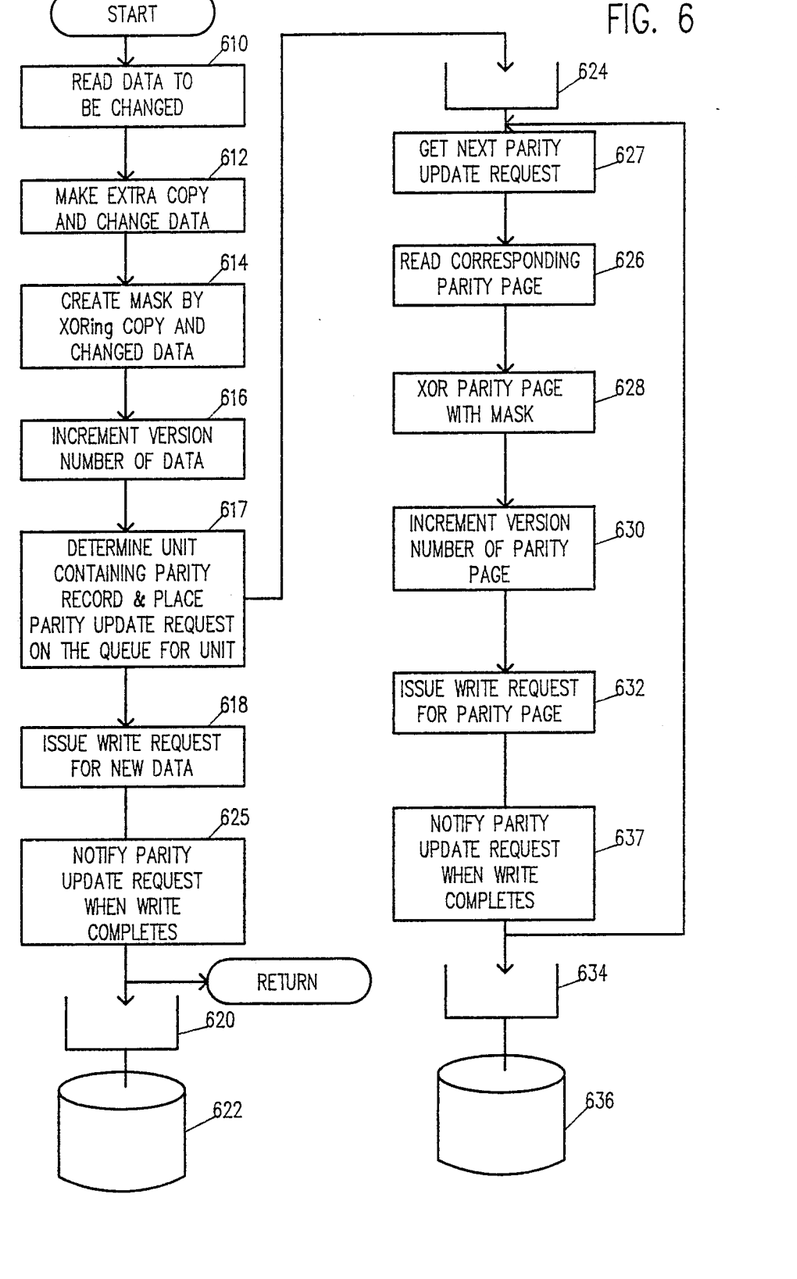
FIG. 6 is a flow diagram of steps involved in updating data records and their corresponding parity records.

In FIG. 6, changing a data record and its corresponding parity record is shown. Such a change may be called for by a person changing data in a data base, or by a machine process requesting a change for a number of reasons. At 610, a user task operating on processor 12 reads the data record to be changed. The user task first makes an extra copy of the data record at 612 and then makes the changes to the data record in a conventional manner.

The user task then creates a change mask at 614 by exclusive ORing the changed data record into the extra copy of the data record. The first bit of the changed data is exclusive ORed with the first bit of the extra copy to form the first bit of the change mask. Each consecutive bit of the changed data is similarly exclusive ORed with corresponding bits of the extra copy to form further bits of the change mask. An already existing machine instruction performs the exclusive OR of the headers of the changed record and the copied record. Two further exclusive OR machine instructions perform exclusive ORs of the pages in 256 byte blocks. The positions in the header corresponding to the version numbers in the parity record are then zeroed in the change mask so that they will not affect the version numbers of the parity record.

The version number in the data record header is then incremented by the user task at block 616. A user task at 617 then determines which unit contains the appropriate parity record by searching the unit table 312 based on the unit number from the physical address of the new data. The unit table indicates which control block 314–318 to use to identify the unit containing the parity record for the particular data record. Again, the address of the new data record is used to identify the stripe of interest. Once the unit containing the parity record for the stripe is identified, task 617 places an update request which includes the record address and change mask on a queue 624 for the appropriate unit. The update request also indicates that the data record has not yet been written. Prior to task 617 placing an update request on queue 624, it searches queue 624 to ensure there can be no confusion with version numbers as discussed previously. If confusion is possible, the user task waits until confusion is not possible before proceeding.

The address of the parity record is known to be the same as the address of the new data except that it is on a different unit. A write request for the new data is issued at 618 to a queue 620. When the data record is written to storage 622, an indication is sent of that fact at 625 to the update request on queue 624. Flow is then returned to wait for the next data record change.

A parity update task starts at 627 by getting the next parity update request from queue 624. Once the parity record identified in the update request has been read at 626, the change mask is exclusive ORed at 628 into the parity record. The version numbers are not changed by the exclusive OR because the change mask contains zeros in the bit positions corresponding to the version numbers. The exclusive OR is performed using the same exclusive OR machine instruction as is used by block 614 of the user task. The parity record version number corresponding to the data record is then incremented at 630, and a write request for the parity record is issued at 632. The parity update task then gets the next parity update request at 627.

A queue 634 stores parity record write requests for the storage units. In this case, a storage unit 636 is indicated for the particular write request. Storage unit 636 is different than unit 622 because the data and the parity records are not to be written to the same unit. When the write of the parity record completes, the update request on queue 624 is notified at 637. When both the data write and the parity write are completed, the entry is removed from queue 624, indicating that there is no longer the possibility of confusion with the version number.

RECORD RECOVERY

Recovery is performed when either a single record read error is encountered during normal operation of the system or when an entire unit fails.

When a unit fails, the data lost on the unit is reconstructed from the remaining units of the set, as indicated in the control blocks stored on more than one member of the set. The failed unit is replaced or repaired. Data for the new unit is then reconstructed from the remaining members of the set record by record. A parity record is reconstructed simply by reading the data records in the set and regenerating the parity. The version numbers in the parity record are set equal to the corresponding version numbers in the data records.

When regenerating a data record, a check is first made on each of the data records to determine if their version numbers match the version numbers in the parity record for that slice. If any of the version numbers in the slice do not match, a lost data indication is written in the header of the lost record. If the version numbers match, the records in the slice are then exclusive ORed one by one into the new record. The appropriate version number is then copied from the parity record into the new record header.

If a read error is encountered on either a data record or a parity record, the contents of the failing record are reconstructed with the same mechanism as described above for recovery of an entire unit. In this case, it is necessary to hold all change activity on the slice containing the failed record while recovery is in progress.

Following reconstruction, normal operation of the system continues, with the only data lost being that for which an update of data or parity was made and a unit failed before the corresponding parity or data record could be written. Thus, the vast majority of data on the failed unit was recovered without the unit redundancy overhead of mirroring. By distributing the parity information over the members of the set as opposed to tying up one device with the parity information, parallel operation of storage devices is utilized to provide maximum access rates.

While the invention has been described with respect to one or more preferred embodiments, and with respect to one particular system, it will be recognized by those skilled in the art that the invention can take many forms and shapes. The record sizes are in no way limited to those discussed, nor are the storage units limited to disk drive devices. The fact that only identical devices are used in sets is merely a matter of design choice for simplification. Numerous combinations of storage units in sets, and the distribution of the data protection or parity blocks are within the scope of the invention as described and as claimed below.

What is claimed is:

1. A data protection mechanism for a computer system having multiple independently accessible storage devices which store blocks of data, the data protection mechanism comprising:
   generator means for generating parity blocks as a function of sets of data blocks, said data blocks in a set corresponding to one parity block being stored on different storage devices;
   storage management means for managing the storage of data blocks and parity blocks onto the storage devices; and
   spreading means coupled to the storage management means for identifying a storage device to the storage management means on which each parity block is to be stored such that no one storage device contains the parity blocks for all of the groups of data blocks.

2. The data protection mechanism of claim 1 wherein the spreading means substantially uniformly distributes the parity blocks to storage devices.

3. The data protection mechanism of claim 2 wherein the spreading means distributes the parity blocks in a round robin manner.

4. The data protection mechanism of claim 1 wherein each data block in a set, and its corresponding parity block form a stripe of the same address ranges of each of the storage devices.

5. The data protection mechanism of claim 4 wherein at least one stripe of same addresses comprises data blocks without a parity block.

6. The data protection mechanism of claim 4 wherein there are at least as many stripes as there are blocks of data in a group plus one for the parity block.

7. The data protection mechanism of claim 4 wherein the size of the address range is at least as large as the largest system allocatable contiguous piece of storage.

8. The data protection mechanism of claim 1 wherein each storage device has the same address size.

9. The data protection mechanism of claim 1 wherein a set comprises at least three storage devices.

10. The data protection mechanism of claim 1 wherein the storage devices in a set are selected to minimize the number of storage devices affected by a failure of a single component of the computer system.

11. The data protection mechanism of claim 1 wherein a block comprises a plurality of predetermined sized records, the mechanism further comprising version generator means for providing independent version numbers to data records having the same address in a set and corresponding version numbers to the parity record covering such set of data records.

12. The data protection mechanism of claim 11 wherein the version numbers comprise counters, and the version generator means increments the counter in a revised data record and increments the corresponding counter in the parity record.

13. The data protection mechanism of claim 12 and further comprising data recovery means for recovering records lost on a failed storage device by combining the remaining records in the set of storage devices.

14. The data protection mechanism of claim 13 wherein the recovery of a lost record from a device is contingent on each remaining record in the one set of records having version numbers matching the versions numbers in the parity record.

15. The data protection mechanism of claim 1 and further comprising change mask means for producing a change mask for a parity record when a data record in the set is to be changed, said change mask being generated as a function of the original data record and the changed data record.

16. A method of protecting data stored on a plurality of memory devices comprising:
dividing addressable memory on each of said memory devices into blocks of memory such that each memory has the same number of blocks, the blocks on each memory having the same address range comprising a stripe;
storing parity information for each stripe of memory blocks in a distributed manner across the memory devices to enhance the overall access rate of the memory devices; and
changing the parity information for each stripe as a function of a change to a block in its corresponding stripe without reading all the blocks in the stripe.

17. The method of claim 16 wherein the step of changing the parity information comprises the steps of:
reading the data to be changed;
making a copy of the data to be changed;
making the changes to the data;
generating a change mask as a function of the copy of the data to be changed and the changed data;
writing the changed data to memory;
reading the corresponding parity data;
applying the change mask to the parity data to update it; and
writing the updated parity data to memory.

18. The method of claim 16 wherein the step of changing the parity information further comprises the step of generating a version number which is stored with both the block of data and the parity block.

19. A data protection mechanism for a computer system having multiple independently accessible storage devices which store records of data, the data protection mechanism comprising:
generator means for generating parity records as a function of sets of data records, said data records in a set corresponding to one parity record, each of said data and parity records being stored on different storage devices;
storage management means for managing the storage of data records and parity records onto the storage devices; and
version generator means for providing independent version numbers to data records in a set and corresponding version numbers to the parity record covering such set of data records.

20. The data protection mechanism of claim 19 wherein the version numbers comprise a 1 bit counter in the data records and a number of one bit counters in the parity record equal to the number of data records in the set.

21. The data protection mechanism of claim 19 wherein reconstruction of a record in a set is conditional upon the version numbers in the remaining records being consistent with the corresponding version numbers in the parity record.

22. The data protection mechanism of claim 19 wherein the version numbers comprise a multibit counter in the data records and a number of multibit counters in the parity record equal to the number of data records in the set, wherein said counters count in a predetermined sequence of values.

* * * * *

REEXAMINATION CERTIFICATE (2812th)
United States Patent [19]
Clark et al.

[11] B1 4,761,785
[45] Certificate Issued Mar. 12, 1996

[54] PARITY SPREADING TO ENHANCE STORAGE ACCESS

[75] Inventors: Brian E. Clark, Rochester, Minn.; Francis D. Lawlor, Saugerties; Werner E. Schmidt-Stumpf, Patterson, both of N.Y.; Terrence J. Stewart; George D. Timms, Jr., both of Rochester, Minn.

[73] Assignee: International Business Machines Corp., Armonk, N.Y.

Reexamination Request:
No. 90/003,210, Oct. 1, 1993

Reexamination Certificate for:
Patent No.: 4,761,785
Issued: Aug. 2, 1988
Appl. No.: 873,249
Filed: Jun. 12, 1986

[51] Int. Cl.$^6$ ................................................ G11C 29/00
[52] U.S. Cl. .................... 371/51.1; 395/182.04; 371/38.1
[58] Field of Search ................. 371/35, 49, 50, 371/51, 38, 49.1, 49.2, 50.1, 51.1, 38.1; 364/200, 900; 365/200; 395/575, 425, 600

[56] References Cited

U.S. PATENT DOCUMENTS

| | | | |
|---|---|---|---|
| 3,387,261 | 6/1968 | Betz | 371/50.1 |
| 3,876,978 | 4/1975 | Bossen et al. | 340/146.1 |
| 4,092,732 | 5/1978 | Ouchi | 364/200 |
| 4,335,458 | 6/1982 | Krol | 371/38.1 |
| 4,433,388 | 2/1984 | Oosterbaan | 371/49 |
| 4,438,512 | 3/1984 | Hartung | 371/60 |
| 4,484,262 | 11/1984 | Sullivan | 364/200 |
| 4,625,301 | 11/1986 | Berger | 365/222 |
| 4,653,055 | 3/1987 | Micic | 371/69.1 |
| 4,722,085 | 1/1988 | Flora et al. | 371/38 |
| 4,817,035 | 3/1989 | Timsit | 364/900 |

OTHER PUBLICATIONS

IBM Technical Disclosure Bulletin, vol. 24, No. 2, Jul. 1981, "Efficient Mass Storage Parity Recovery Mechanism" F. D. Lawlor, pp. 986–987.

"A Case for Redundant Arrays of Inexpensive Disks (RAID)" by David A. Anderson, et al., ACM SIGMOND Conference, Chicago, Illinois, Jun. 1988.

IBM Technical Disclosure Bulletin, vol. 24, No. 6, Nov. 1981, pp. 2769–2770, entitled "Longitudinal Parity Generation for Single–Bit Error Correction" by A. R. Barsness, W. H. Cochran, W. A. Lopour, and L. P. Segar.

IBM Technical Disclosure Bulletin, vol. 17, No. 4, Sep. 1974, pp. 993–995, entitled "Memory Board Address Interleaving" by C. E. Gifford, R. J. Kriger, and W. R. Sitler.

IBM Technical Disclosure Bulletin, vol. 15, No. 4, Sep. 1972, pp. 1128–1130, entitled "Error–Correction System for High–Data Rate Systems" by N. F. Brickman and J. A. Parisi.

"Disk Striping" by Kenneth Salem and Hector Garcia-Molina, Princeton University, Department of Computer Science, EECS–TR–332–84 (Revised) Dec. 1984.

*Primary Examiner*—Robert W. Beausoliel, Jr.

[57] ABSTRACT

A storage management mechanism distributes parity blocks corresponding to multiple data blocks substantially equally among a set of storage devices. N storage units in a set are divided into a multiple of equally sized address blocks, each containing a plurality of records. Blocks from each storage unit having the same address ranges form a stripe of blocks. Each stripe has a block on one storage device containing parity for the remaining blocks of the stripe. Further stripes also have parity blocks, which are distributed on different storage units. Parity updating activity associated with every change to a data record is therefore distributed over the different storage units, enhancing access characteristics of the set of storage devices. The parity updating activity also includes the use of an independent version number stored with each data record and corresponding version numbers stored with the parity record. Each time a data record is changed, its version number is incremental and the corresponding version number in the parity record is incremented with the parity record update.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *